United States Patent [19]

Waas

[11] Patent Number: 4,471,479

[45] Date of Patent: Sep. 11, 1984

[54] CIRCUIT ARRANGEMENT FOR TIME-DIVISION MULTIPLEX TELECOMMUNICATION EXCHANGE SYSTEMS COMPRISING MULTIPLEX LINES WHOSE TIME CHANNELS SERVE PARTIALLY FOR MESSAGE CONNECTIONS AND PARTIALLY FOR THE TRANSMISSION OF SIGNALING INFORMATION

[75] Inventor: Oskar G. Waas, Zurich, Switzerland

[73] Assignee: Siemens Aktiengesellschaft, Berlin & Munich, Fed. Rep. of Germany

[21] Appl. No.: 374,266

[22] Filed: May 3, 1982

[30] Foreign Application Priority Data

Jun. 4, 1981 [DE] Fed. Rep. of Germany ....... 3122230

[51] Int. Cl.$^3$ .............................................. H04J 3/02
[52] U.S. Cl. ....................................... 370/58; 370/66
[58] Field of Search ............... 370/66, 68, 58; 370/59, 370/63, 64

[56] References Cited

U.S. PATENT DOCUMENTS 4,207,435 6/1980 Okada et al. ........................... 370/68
4,320,501 3/1982 Le Diev et al. ....................... 370/68
4,392,224 7/1983 Mori et al. ............................. 370/68

FOREIGN PATENT DOCUMENTS 1263006 2/1972 United Kingdom .

OTHER PUBLICATIONS

"EWSD Digital Switching System", Telcom Report, vol. 4, 1981, Special Issue, Siemens AG, Munich.
"Line Transmission", CCITT Orange Book, vol III-2, International Telecommunication Union, Geneva, 1981, pp. 425-437.

Primary Examiner—Douglas W. Olms
Assistant Examiner—Kenneth I. Rokoff
Attorney, Agent, or Firm—Hill, Van Santen, Steadman & Simpson

[57] ABSTRACT

In a circuit arrangement for time-division multiplex telecommunication systems, the signaling information transmitted over a signal channel per time-division multiplex and combined in super pulse frames is switched over the time-division multiplex switching matrix serving for the switching of message channels. Two holding memories are assigned to an information memory. One of the holding memories serves for the switching of message information and operates with a circulation cycle corresponding to a pulse frame. The other holding memory serves for switching of the signaling information and operates with a cycle corresponding to a super pulse frame. The second holding memory is advanced with each full cycle of the first holding memory.

2 Claims, 1 Drawing Figure

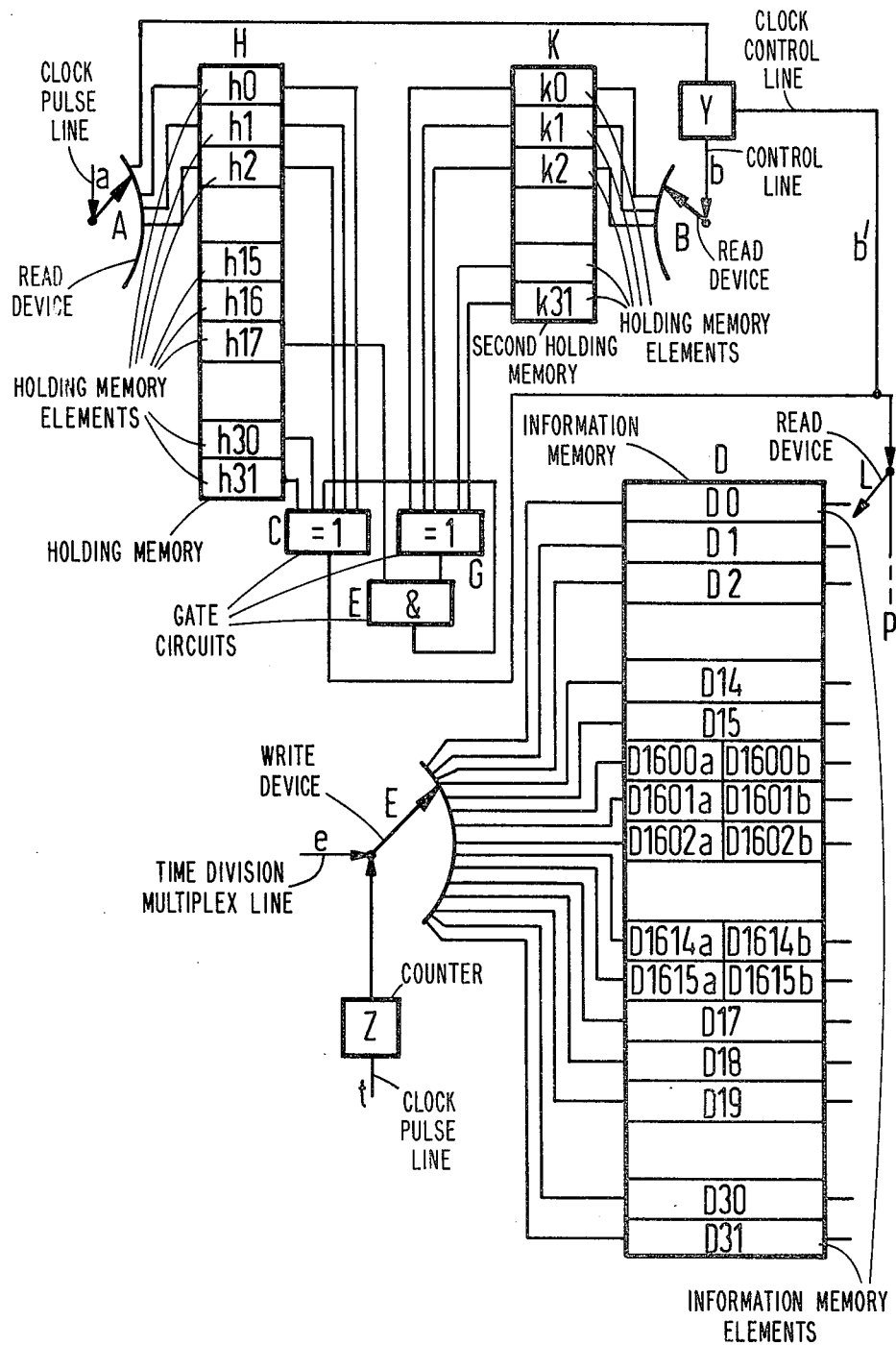

CIRCUIT ARRANGEMENT FOR TIME-DIVISION MULTIPLEX TELECOMMUNICATION EXCHANGE SYSTEMS COMPRISING MULTIPLEX LINES WHOSE TIME CHANNELS SERVE PARTIALLY FOR MESSAGE CONNECTIONS AND PARTIALLY FOR THE TRANSMISSION OF SIGNALING INFORMATION

BACKGROUND OF THE INVENTION

1. Field of the Invention

The present invention relates to a circuit arrangement for time-division multiplex telecommunication exchange systems, particularly pulse code modulation (PCM) telephone exchange systems, comprising time-division multiplex (TDM) lines on which a respective plurality of time channels form a time-division multiplex, and on which different, successively following time slots are assigned to the time channels, and on which the time slots are arranged in pulse frames, and on which the same respective time slot is assigned to each of the individual time channels in the various following pulse frames. More particularly, such a circuit arrangement comprises time-slot multiples which are equipped with information memories and holding memories, by way of which time-slot multiples the time channels on a time-division multiplex line connected at the input can be individually switched to time channels on a time-division multiplex line connected to the output, and comprises a respective signal channel provided per time-division multiplex and serving as one of its time channels for the transmission of individual switching identifiers assigned to the remaining time channels, the time slots of the signal channel being combined over a plurality of pulse frames, just as the pulse frames, into successively-following super pulse frames, within which time slots within the super pulse frames which serve as connection-associated message channels are assigned to the remaining time channels, and further comprising information memories in which the right mode is cyclically sequenced in accordance with the successive time slots of the channels of the incoming multiplex lines and which has a read mode which is sequenced in accordance with the memory element addresses of the information memories stored in the holding memory, the information memory element addresses being cyclically read in accordance with the successive time slots of the channels of the time-division multiplex lines connected at the output.

2. Description of the Prior Art

In time-division multiplex telecommunication systems as described, for example, in the periodical "telcom report" (Vol. 4/1981/supplement), a respective common signal channel is provided for a plurality of time channels, for example, for 30 time channels. The signal channel serves for the transmission of signaling information in individual assignment for each of the remaining 30 time channels which can be considered as message channels individually and randomly selectable for the completion of individual connections. The sub-information transmitted across a time-division multiplex line and individually corresponding to the time channels are arranged in pulse frames in a universally-known manner. A pulse frame always encompasses a series of sub-information of which a respective sub-information is assigned to a respective time channel. One of the sub-information is assigned to the signal channel. Since the sub-information assigned to the signal channel within a single pulse frame would not suffice in order to signalize the individual switching identifiers individually assigned to the message channels for the remaining time channels serving as message channels in the appertaining time-division multiplex line, the sub-information corresponding to the signal channel are combined over a plurality of pulse frames into super pulse frames within which the chronological position, i.e. the chronological relationship to the respective beginning of each super pulse frame, individually specifies the assignment of a sub-information to one of the remaining time channels employed as message channels. For this purpose, the sub-information is assigned to the signal channel within a respective pulse frame can be assigned to a respective or to two or more of the remaining time channels of the appertaining time-division multiplex line which are employed as message channels, or the sub-information within two or more successive pulse frames can be assigned to one each of the remaining time channels. Usually, the sub-information within a single pulse frame and assigned to the signal channel is sub-divided into two parts with the same respective plurality of bits, of which each part is individually assigned to a respective remaining time channel, i.e. the time channels serving as message channels.

It is standard in time-division multiplex telephone exchange systems (v.,for example, see the periodical "telcom report"), to accept the signaling sub-information serving for the signaling of switching identifiers and assigned to the time channels of each of the time-division multiplex lines with the assistance of a decentralized control device of a terminating group (LTG) (the same also applies to analog trunk lines and to analog subscriber lines) and to forward the same to a central control unit. The central control unit processes the signaling sub-information and designationally conducts the same to the decentralized control devices of those terminating groups by way of which the connections were forwarded which proceed over the time channels belonging to the time-division multiplex line.

In order, however, to significantly reduce the considerable control unit load which occurs from the mere switching identifier forwarding by signaling sub-information which are always taken by the term groups from the time channel of each of the time-division multiplex lines serving for the signaling of switching identifiers and to subsequently resupply the time channels according to the exchange data of each individual connection of all through-connected connections, and arrangement has been created according to the German Letters patent No. 1,910,974, corresponding to British patent specification No. 1,263,006, which are fully incorporated herein by this reference, which, for the switching of sub-information serving for the signaling of switching identifiers, from a switching matrix for the through-connection of message connections ("connection switching matrix") additionally provides a further switching matrix ("signal switching matrix") for the through-connection of such connections, by way of which further switching matrix the sub-information corresponding to the message connection and serving for the signaling of switching identifiers can be switched. This circuit arrangement proceeds from the fact that each of the sub-information is provided with a respective assignment information which specifies the assignment to the respective message time channel.

SUMMARY OF THE INVENTION

In contradistinction to the arrangement known from the aforementioned Letters Patent, the invention proceeds therefrom that an assignment information of the aforementioned type need not be provided and this assignment, as already mentioned above, results from the chronological relationship to the respective beginning of each super pulse frame. This assumption which, therefore, is based on an advantageous elimination of the special allocation information, makes it necessary that the switching of the sub-information serving for the signaling of switching identifiers be rendered possible in some other manner.

It is therefore the object of the invention, given a circuit arrangement of the type generally set forth above, to enable a switching of sub-information serving for the signaling of switching identifiers and individually assigned to the message channels for that purpose under the pre-condition that no auxiliary information indicating such an assignment are attached to the sub-information. In a manner known per se (of the cited Letters Patent), this is to serve the purpose of relieving the central control unit and the decentralized control devices of the task of forwarding switching identifiers.

The above object is achieved, according to the present invention, in that, in addition to a first holding memory whose read cycle corresponds to the pulse frame duration, a second holding memory is assigned to an information memory, the program execution of the second holding memory occurring with each read cycle of the first holding memory, whereby its read cycle accordingly corresponds to a super pulse frame duration which amounts to a multiple of the pulse frame duration. The signal channel sub-information are cyclically stored according to the constantly recurring sequence of their time slots within each of the super pulse frames, being stored at a plurality of information memory locations provided in accordance with this multiple in the information memory. Upon attainment of that holding memory location in the cyclical read operation of the first holding memory which corresponds to the signal channel time slot, i.e. to one of the pulse frame time slots, and with the assistance of a memory location address of the information memory which is stored in a second holding memory in accordance with the time slot reached within a super pulse frame, i.e. in accordance with a super pulse frame time slot, a memory element of the information memory is regularly selected which stores that signal channel sub-information which belongs to that time channel of the remaining time channels to which the pulse frame time slot and the super pulse frame time slot are constantly assigned.

The present invention creates the possibility of likewise through-connecting the signaling information belonging to each of the message channels via a time-division multiplex switching matrix, namely even under the precondition that the signaling information exhibits no additional assignment information which would specify an assignment of the respective signaling information to one of the remaining channels employed as message channels. This is of particular significance for so-called dedicated connections; dedicated connections are connections through-connected over channels, thus over time-division multiplex channels in the present case, which are retained in their through-connected state over a longer period of time and serve for the direct connection of other exchanges to one another and by way of which individually-selected connections are successively completed and, in turn, disconnected without the control elements of the appertaining exchange in which such dedicated connections are through-connected having anything to do with the switching identifier forwarding in the manner set forth above.

BRIEF DESCRIPTION OF THE DRAWING

Other objects, features and advantages of the invention, its organization, construction and operation will be best understood from the following detailed description, taken in conjunction with the accompanying drawing, on which there is a single schematic representation of a circuit arrangement constructed in accordance with the present invention.

DESCRIPTION OF THE PREFERRED EMBODIMENTS

The exemplary embodiment of the invention illustrated on the drawing is shown only in terms of those components which are essential in contributing to the understanding of the invention. The following description, which first treats the general interrelationships and functions of the exemplary embodiment and only embarks upon a discussion of its inventive characteristics further below, presumes that a multi-stage switching matrix designed for PCM connections which is partially constructed of time stages and partially of space stages is already generally known to those skilled in the art; for example, such a switching matrix is illustrated and described in the allowed German application No. 21 08 745, particularly FIG. 1 and its appertaining description.

A time-slot multiple is illustrated on the drawing. An incoming time-division multiplex line is referenced e and an outgoing time-division multiplex line is referenced p.

The illustrated time-slot multiple is a component of a larger PCM time-division multiplex switching matrix network. For the purpose of completing a connection, a free connection path which can be completed across free connection channels of the time-division multiplex lines is sought and selected in a manner known per se with the assistance of a link-finding device. Holding memories are provided in conjunction therewith. The holding memories H and K are assigned to the illustrated time-slot multiple. Holding memories are likewise assigned to further time-slot multiples and space-slot multiples which are not illustrated on the drawing.

The aforementioned holding memories serve for the storage of exchange data which specify the assignment of outgoing time channels to incoming time channels, respectively within one of the multiples. This assignment corresponds to the through-connection data for each connection in a space-switching multiple of a conventional type (input coordinate line number/output coordinate line number).

As is known, exchange data are determined with the assistance of a link-finding device by information-processing logical linkage operations for each connection on the basis of data stored in a seizure memory (route-finding network in systems of an earlier type) concerning the condition (free or busy) of all determinant parts of the switching matrix, primarily the intermediate lines. These exchange data unequivocally indicate the course of a connection to be through-connected and through-connected across the multi-stage switching matrix regarding the intermediate lines and matrix switching points or, respectively, time-division multiplex lines, time channels, time slots, etc., which are thereby claimed. If, instead of a single-channel connection, it is a matter of a multi-channel connection, then a plurality of such link-finding operations can be individually executed for the plurality of connection completion operations which are required.

The exchange data determined by link-finding operations, insofar as they relate to a connection extending over the appertaining time-division multiplex switching matrix network, are stored in holding memories of the time-slot multiples and of the space-slot multiples. In the case of the time-slot multiples, the memory locations of the respective assigned holding memory are permanently assigned to the channel numbers of the outgoing time channels. The connection-associated sub-information arriving per pulse frame over the incoming time channels of a PCM time-division multiplex line are cyclically inscribed into the full memory, for example, the memory D, respectively assigned to the appertaining time-slot multiple. In contrast thereto, the read mode, which serves the purpose of forwarding these sub-information individually over the outgoing time channels, occurs in accordance with the exchange data which specifies the assignment of the outgoing time channels to the incoming time channels and are stored per outgoing time channel at memory locations of a holding memory in the form of memory location addresses of the information memory. Therefore, the information memory location address under which the sub-information to be forwarded via a specific time channel is inscribed, i.e. intermediately stored, is indicated per out-going time channel at a memory location in a holding memory which is respectively permanently assigned to the time channel.

As mentioned, the memory locations of the holding memory are permanently assigned to the time channels of an outgoing time-division multiplex line. For the purpose of forwarding the intermediately-stored sub-information from the information memory, consequently, the memory locations of a holding memory are cyclically selected in accordance with the time slots of the outgoing time channels.

The aforementioned, cyclical inscription of the sub-information arriving via a time-division multiplex line, for example the line e, incoming to a PCM time-slot multiple into the information memory D of the time-slot multiple, occurs with the assistance of a selection write device E. Therefore, the selection write device of a time-slot multiple is continuously advanced for the purpose of sequencing this cyclical inscription. The reading of the information over a time-division multiplex line p, continuing from a PCM time-slot multiple, for example Z1, Z2 occurs with the assistance of the appertaining holding memory.

The description up to this point has treated the interrelationships and functions of an exemplary embodiment of the invention in a more general manner. The same will now be treated with respect to the more detailed characteristics of the invention.

A PCM time-division multiplex system in which 32 channels are formed on a time-division multiplex line by time multiple division is described in the ORANGE BOOK, VOLUME III-2, recommendation Rec. G. 732 (Line Transmission/4. Signaling, pp. 429 ff) of the Sixth Plenary Assembly (Sept. 27–Oct. 8, 1976) of the International Telegraph and Telephone Consultative Committee (CCITT). One channel (channel 0) serves, among other things, for the transmission of a frame identification character, whereby the time slot of the pulse frame boundary is specified. A further channel (channel 16, the signaling channel) serves for the transmission of signaling information for all 30 remaining channels which can be employed as communication channels and, to this end, can be individually and selectively seized in a manner known per se in the completion of individual connections. In a manner known per se, signaling information serve for the identification of the beginning and of the end of switching identifiers, for example end of dial identifiers, start characters, end characters, fee pulses and the like, which are to be transmitted in conjunction with a respectively completed connection in addition to the actual message information.

The sub-information which can be transmitted per channel and per pulse frame are also referred to as "words". A word always comprises a sequence of 8 bits per channel and per pulse frame.

Since, however, 8 bits would not suffice for signaling switching identifiers for the 30 channels employed as message channels, the words of the respective 16th time slot of a total of 16 successive pulse frames are combined into a super pulse frame. One of these words serves, among other things, for the identification of the time slot of the super pulse frame boundaries. Of the remaining 15 words of the signaling channel, one each serves for signaling for two message channels. Each of these words comprises 8 bits. The first four bits of a word, also referred to as a "half word", are always permanently assigned to one message channel and the further four bits, likewise a "half word", are permanently assigned to a further message channel. Consequently, the assignment of each half word to a message channel derives, on the one hand, from the time slot of the appertaining word in the signaling channel in relation to its super pulse frame boundaries and, on the other hand, therefrom as to whether the appertaining half word within the word resides at the first or second location. This assignment, therefore, is generally fixed and is not in need of assignment information as is described in the German Letters patent No. 1,910,974.

An excerpted time-slot multiple is illustrated on the drawing. It is a component of a multi-stage switching matrix of the PCM telephone exchange system. A time-division multiplex line e is connected to the time-slot multiple at the input side. A time-division multiplex line p is connected to the time-slot multiple at the output side. The 32 time channels are conducted across these time-division multiplex lines. The time channels form a time-division multiplex in a manner known per se. Different, successively-following time slots are permanently assigned to the time channels. These time slots are arranged in pulse frames in a manner known per se. The same respective time slot is assigned to each of the individual time channels in the various, successive pulse frames.

The time-slot multiple is equipped with an information memory D and with two holding memories H and K. By way of the time-slot multiple, the time channels on the time-division multiplex line e can be individually switched to the time channels of the time-division multiplex line p connected to the output side.

One of the time channels serves for the transmission of individual switching identifiers assigned to the remaining time channels. This channel is referred to as the "signal channel" or (previously) as a "signaling channel". As has already been set forth, the time slots of the signal channel are combined over a plurality of pulse frames into super pulse frames which, just like the pulse frames, successively follow one another; as likewise already described, the time slots within the super pulse frames are permanently assigned to the remaining time channels which serve connection-associated as message channels. The chronological relationship of the half words serving as signaling information, the chronological relationship lying in this fixed assignment, determines to which of the time-division multiplex channels serving as message channels a respective half word is assigned for the purpose of switching identifier signaling.

In the case of the information memory D, the write mode is cyclically sequenced in accordance with the successive time slots of the channels of the incoming time-division multiplex line e. A write device E serves this purpose. In contrast thereto, the read mode is sequenced in accordance with the memory location addresses of the information memory stored in a holding memory. As shall be set forth below, a total of two holding memories H and K are provided. The holding memories are cyclically read in accordance with the successive time slots of the channels on the outgoing time-division multiplex line p.

As is readily apparent from the drawing, the information memory D comprises information memory elements D0–D15 and D17–D31. As known, the first channel serves, among other things, for the transmission of the pulse frame identification word. This serves the purpose of synchronization in a known manner. The information memory elements D1–D15 and D17–D31 serve for receiving the PCM words of those channels of this time-division multiplex line which serve as message channels, the PCM words arriving in succession over the time-division multiplex line e. Accordingly, upon receipt of these PCM words, the write device E is successively advanced from information memory location-to-information memory location (D1 through D15 and D17 through D31).

Sixteen further information memory elements D1600$a$/D1600$b$–D1615$a$/D1615$b$ are provided between the information memory element D15 and the information memory element D17. These serve for receiving the signaling information. The first of these information elements D1600$a$/D1600$b$ serves, among other things, for the acceptance of the super pulse frame identifier word. The further information memory elements D1601$a$/D1601$b$–D1615$a$/D1615$b$ serve for the acceptance of the half words serving the signaling of switching identifiers. Each of the information elements, for example, D1600$a$/D1600$b$, is subdivided into two portions, for example the portions D1600$a$ and the portion D1600$b$. An information memory element encompasses a total of 8 bits; consequently, each of its portions encompasses 4 bits memory capacity. Each of the two portions of the information nenirt elements D1601$a$/D1601$b$–D1615$a$/D1615$b$ is respectively permanently assigned to one of the remaining channels employed as message channels which extend over the time-division multiplex line e.

As already mentioned above, of the PCM words transmitted over the signal channel, the first within a super pulse frame serves, among other things, for the transmission of the super pulse frame identifier word. The second of the PCM words comprises the two half words serving for the signaling of switching identifiers which are assigned to the two first time channels of the remaining time channels which serve as communication channels. The same is also true of the further PCM words transmitted over the signal channel.

As also already explained above, the write device E of the information memory D is continuously program-executed according to the cyclical write operation. Regarding the forwarding from the information memory element D15 to the respectively next information memory element, this continuity is designed in such a manner that the advancement always occurs to that one of the information memory elements of the information memory D which corresponds to the time slot of the PCM word serving the signaling of switching identifiers and respectively to be accepted in the time slot and that the respectively succeeding advancement occurs directly to the information memory element D17. The write device E, which is continuously advanced with the assistance of clock pulses on a clock pulse line t, is, for the aforementioned purposes, equipped with a counter Z with whose assistance, given the advancement from the information memory element D15 to one of the information memory elements D1600$a$/D1600$b$–D1615$a$/D1615$b$ and from this to the information memory element D17, the previously specified manner of operation can be accomplished in a manner at the command of those skilled in the art.

As already explained above, a second holding memory K is assigned to the information memory D in addition to the first holding memory H whose read cycle corresponds to the pulse frame duration. The advancement of the second holding memory K occurs with each read cycle of the first holding memory. To this end, a control line b is provided by way of which, given respectively one cycle of the read device A of the holding memory H, the read device B of the holding memory K receives an advancement pulse. The read device A of the holding memory H is advanced with a central clock pulse.

The aforementioned exchange data are stored in the holding memory H. This storage occurs in the assignment of a respective holding memory element h0–h31 to respectively one time slot of the time channels of the outgoing time-division multiplex line p. Therefore, the exchange data assigned to the individual time channels on the time-division multiplex time p are stored in each of the holding memory elements h0–h31. This storage occurs in a manner known per se in conjunction with the aforementioned link-finding device. The stored exchange data respectively indicate the exchange-oriented allocation of the time channels of the outgoing time-division multiplex line p to the time channels of the incoming time-division multiplex line e.

The read operation of the information memory D is sequenced with the assistance of a read device L. The read device L is controlled with the assistance of the exchange data serving as drive addresses therefore, the exchange data being taken with the assistance of the read device A of the holding memory H in cyclical succession from its holding memory elements h0–h31. Therefore, the read device L is not continuously advanced as the write device E but, rather, according to the exchange data stored in the holding memory H. These exchange data pass a gate circuit C insofar as the gate circuit E emits no output signal. This is always the case when the read device A of the holding memory H is set to one of the holding memory elements h0–h15 and h17–h31.

When the read device A of the holding memory H reaches the holding memory element h16, then an auxiliary information arrives from the holding memory element h16 to the gate circuit E which is designed as an AND gate. By way of a gate G, moreover, the second holding memory K offers an information memory element address at its output which likewise arrives at the AND gate E.

As has already been set forth above, the read cycle of the holding memory H corresponding to the pulse frame duration and the read cycle of the holding memory K, whose advancement occurs with each read cycle of the holding memory H, respectively corresponds to the super pulse frame duration which amounts to a multiple of the pulse frame duration, namely sixteen times. When, therefore, the read device A of the holding memory H reaches the holding memory element h16, then the read device B of the holding memory K is set to one of the holding memory elements k0–k31. Upon reaching that holding memory location in the cyclical read operation of the first holding memory H which corresponds to the signal channel time slot, i.e. to one of the pulse frame time slots, and with the assistance of an information memory location address which is stored in the second holding memory K according to the time slot reached within a super pulse frame, i.e. a super pulse frame time slot, an information memory element storing that signal channel sub-information is selected which belongs to that time channel of the remaining time channels to which the pulse frame time slot as well as the super pulse frame time slot is permanently assigned. Therefore, the auxiliary information stored in the holding memory H effects, upon attainment of the holding memory element h16, that the information memory element address stored in the respective holding memory element, for example the element k2, reached by the reading device B of the holding memory K is relayed as setting information to the read device L of the information memory D via the gate circuits E, G and C.

Since the setting of the read device B of the holding memory is always different in the successive pulse frames, and since the respective information memory element address received upon attainment of the signal channel time slot via the gate circuits E, G and C is always different from pulse frame-to-pulse frame, the read device L, upon respective attainment of the signal channel time slot, is always set in the successive pulse frames to a different information memory element of the information elements D1600a/D1600b–D1615a/D1615b.

Although it would also be possible to store only the signaling information assigned to one message channel in each of the information memory elements D1600a/D1600b–D1615a/D1615b, this would result in a greater required memory expense in the information memory. In fact, therefore, the signaling information which is assigned to two different message channels is stored in a single information memory element, for example the memory element D1601a/D1601b. Therefore, two respective half words are stored in one information memory element.

In reading one of the information memory elements D1600a/D1600b–D1615a/D1615b by an information memory element address respectively taken from the holding memory K, only one of the two half words is output over the time-division multiplex line p, namely that respective half word which is assigned by the aforementioned exchange data to a specific message channel of the time-division multiplex line p. In addition to an information memory element address stored in the holding memory K, an indication is therefore always stored as to which of the two half words stored in an information memory element is assigned in exchange-oriented terms to the appertaining message channel of the time-division multiplex line p. In addition to the respective information memory element address, therefore, there also occurs the aforementioned indication from the exchange data described above.

In order to render the above explanations more precise, it must be pointed out that two half words are to be output in the signal channel time slot within each of the pulse frames on the receiving side just as well as on the transmitting side. Therefore, within the signal channel time slot, two read operations of the read device L must always be executed in succession. For this purpose, the half word taken in the first of these two read operations from the information memory in the manner described above arrives at the chronologically first location within the signal channel time slot and the half word taken during the second read operation arrives at the chronologically second position. For the 32 half words to be emitted within a super pulse frame, i.e. therefore 16 PCM words in the respective signal channel time slot, which are to be transmitted over the time-division multiplex line p, 32 information memory location addresses are required. Therefore, the holding memory K is likewise equipped with 32 memory elements. Whenever the holding memory H reaches the holding memory element h16, an information memory element address is first taken in the described manner from the holding memory K to which address the additional specification is attached concerning which of the two half words stored in an information memory element is assigned in exchange-oriented terms to the appertaining message channel of the time-division multiplex line p. The read device L is thereby set and, in the manner described, a first read operation within the signal channel transmission time slot and the transmission over the time-division multiplex line p occurs. The additional indication is also referred to as a "position indication". When the first read operation of the read device B has been carried out and the read device L has been thereby set, then a clock Y in the control line b receives a one-ahead pulse over the control line b' which causes advancement of the read device B of the holding memory K, namely still within the same signal channel transmission time slot. The read device B now takes a further information memory element address from the next memory element of the holding memory K which it has reached, namely again with the additional position indication. The read device B forwards both to the read device L which is set by this address and, on the basis of this position indication, takes either the first or the second half word from the appertaining information memory element. The half word which has now been taken is output as the second within the respective signal channel transmission time slot.

Therefore, the time slot of a half word assigned to a message channel and to be transmitted over the time-division multiplex line p is determined in a three-fold regard. First, it is always a matter of the signal channel time slot within a pulse frame. Secondly, it is a matter of a specific super pulse frame time slot, i.e. a time slot within each of the super pulse frames. Thirdly, it is a matter of the position of the appertaining half word within this super pulse frame time slot, i.e. a matter of the question whether the appertaining half word resides within the super pulse frame time slot at the first position or at the second position. The super pulse frame time slot and the position correspond to the assignment of each half word to the appertaining message channel.

As has been explained above, the information memory element address to be respectively read from the holding memory K is always already offered via the gate G to the gate E when the read device A of the holding memory H reaches the holding memory element h16. In contrast thereto, however, there is also the possibility that, upon attaining the signal channel time slot within a pulse frame, i.e. within a pulse frame time slot, the first holding memory H always occasions the second holding memory K to read an information memory element address stored therein and to emit the same to the read device L as the address for the drive of the information memory. To this end, it would be necessary to supply the auxiliary information which is respectively read from the holding memory element h16 not to the gate E but, rather, to the holding memory K or, respectively, to its read device B.

It is possible with the assistance of the arrangement described on the basis of the drawing to through-connect the signaling information which is assigned to each of the channels transmitted over the time-division multiplex line e in time-division multiplex to the time-division multiplex line p just like the words (sub-information) assigned to the channels. The exchange-oriented assignment thereby occurs per respective pulse frame for the words serving for the message transmission and per super pulse frame for the half words serving for signaling. These two types of exchange-oriented assignments, namely, on the one hand, that of the channels serving for the message transmission to one another and, on the other hand, that of the half words within the signal channels serving for signaling, correspond to one another.

As explained above, of the PCM words transmitted over the signal channel, the first within a super pulse frame serves, among other things, for the transmission of the super pulse frame identifier word. The second of these PCM words comprises the two half words serving the signaling of switching identifiers, the half words being assigned to two first time channels of the remaining time channels which serve as message channels. As an example relating thereto, let is be specified that the channels 1 and 2 are assigned to the two half words of the second PCM word transmitted over the signal channel within a super pulse frame. Deviating therefrom, however, this assignment can also be differently fixed. In conjunction with the explanations given in the aforementioned Orange Book, the channels 1 and 17, for example, can also be assigned to two half words of the above second PCM word; further, the channels 2 and 18 can be assigned to the third PCM word, etc. In this case, the circuit arrangement described on the basis of the drawing operates in an analogous manner.

Although I have described my invention by reference to particular embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a circuit arrangement for time-division mutiplex telecommunication exchange system, of the type in which a plurality of time-division multiplex lines are provided on which a respective plurality of time channels are time-division multiplexed, and on which different sequentially following time slots are assigned to the time channels and arranged in time-division multiplex pulse frames, and on which the same respective time slot is assigned to each of the individual time channels in the different successive pulse frames, in which time-division multiplex switching matrices are provided which include inputs and outputs and which are equipped with information and holding memories, the time-division switching matrices operable to individually switch the time channels on an incoming time-division multiplex line connected to an input to time channels on an outgoing time-division multiplex line connected to an output, in which a respective signal channel is provided per time-division multiplex pulse frame and serves, as one of its time channels, for the transmission of switching identifiers which are individually assigned to the remaining time channels, in which the time slots of the signal channels are combined over a plurality of pulse frames into super pulse frames which, in the same manner as the time-division multiplex pulse frames, sequentially follow one another, within which super pulse frames time slots are assigned to the remaining time channels which serve as message channels, and in which the information memories are operable in the write mode to be cyclically sequenced in accordance with the successive time slots of the time channels of the incoming time-division multiplex lines and in a read mode in accordance with memory addresses of the information stored in a holding memory cyclically in accordance with the successive time slots of the time channels of the outgoing time-division multiplex lines, the improvement, in combination therewith, comprising:

a first holding memory assigned to the information memory, including memory elements, and operable in a read cycle which corresponds to the pulse frame duration; and a second holding memory assigned to the first holding memory, including memory elements, and operable with each read cycle of the first holding memory, whereby its read cycle corresponds to a super pulse frame duration which amounts to numerical multiple of the pulse frame duration, the signal channel sub-information being cyclically stored in accordance with the constantly repeating sequence of the time slots of the sub-information within each of the super pulse frames and at a plurality of information memory elements provided in accordance with the numerical multiple in the information memory, and upon attaining the holding memory element in the cyclical read operation of the first holding memory which corresponds to one of the signal time slots and with the assistance of a memory element address of the information memory stored in the second holding memory in accordance with the time slot reached within a super pulse frame, operable to store in a regularly selected information element that signal channel sub-information which belongs to that time channel of the remaining time channels to which the pulse frame time slot and the super pulse frame time slot are permanently assigned.

2. The improved circuit arrangement of claim 1, wherein:

said first holding memory, upon attaining the signal channel time slot within a pulse frame of a pulse frame time slot, includes means operable to cause reading of an information memory element storage address stored in said second holding memory as the address for driving the information memory.

* * * * *